June 26, 1934.   A. E. W. JOHNSON ET AL   1,964,582
TRACTOR PLANTER
Filed June 22, 1931
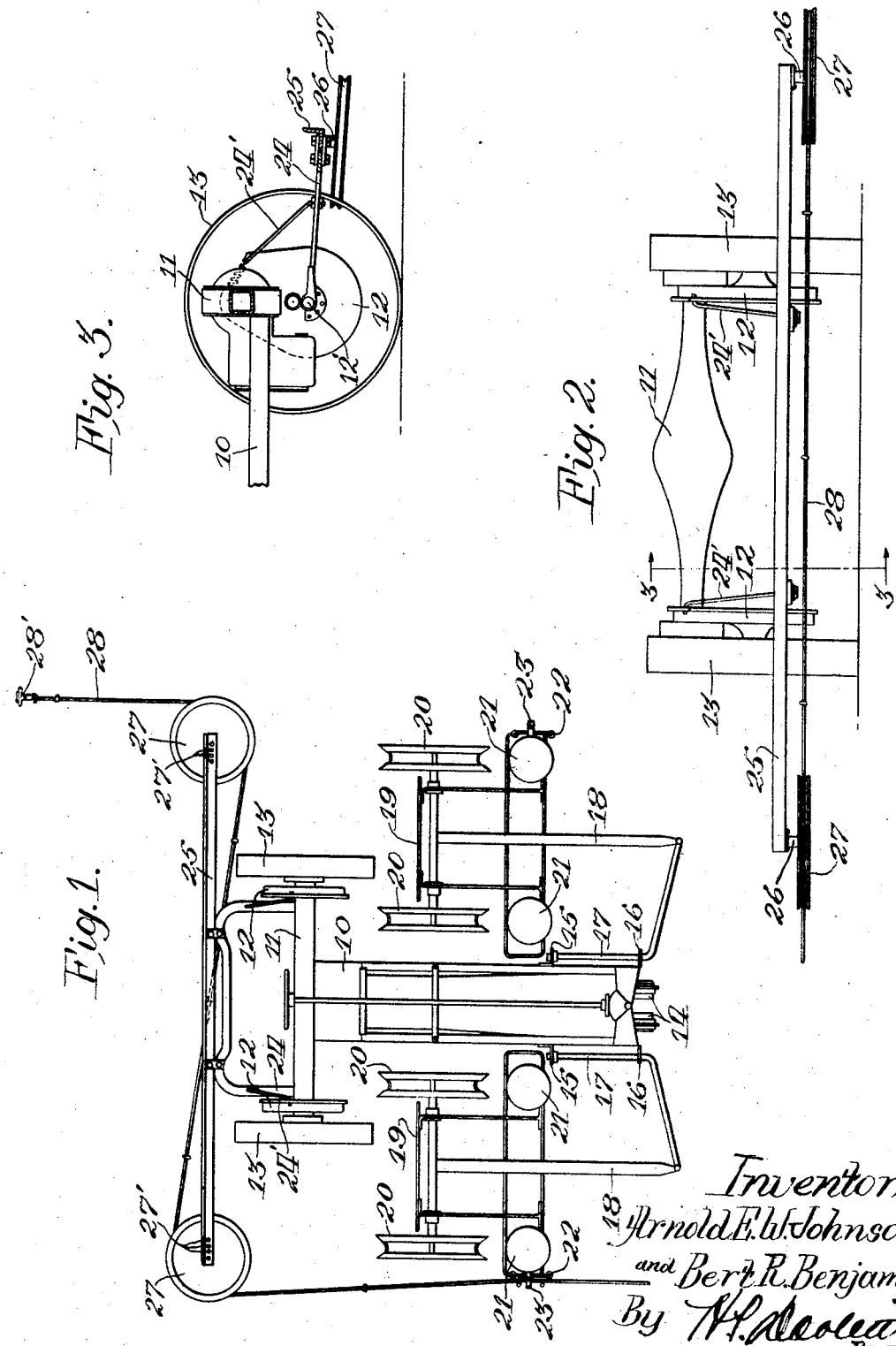

Patented June 26, 1934

1,964,582

UNITED STATES PATENT OFFICE 1,964,582

TRACTOR PLANTER

Arnold E. W. Johnson, Chicago, and Bert R. Benjamin, Oak Park, Ill., assignors to International Harvester Company, a corporation of New Jersey Application June 22, 1931, Serial No. 545,974

9 Claims. (Cl. 111—48)

This invention relates to improvements in check row attachments for tractor corn planters.

More specifically it relates to check row attachments particularly adapted for planters which simultaneously plant a plurality of rows, as with tractor mounted and operated planters.

A principal object of the invention is to provide improved means for receiving a check wire at one side of a tractor planter and for laying it down at the other side in position for the return trip of the tractor planter without disturbing the check.

Another main object of the invention is the arrangement, in combination with a tractor, of a plurality of planter units mounted forwardly of the tractor at the sides thereof, and an improved check wire carrying and discharging means mounted on the rear of the tractor in cooperative relation to the units.

Another object is the provision of laterally adjusting means for the check wire carrying means.

Another object resides in the construction of wire carrying sheaves in such a manner that the wire will automatically be discharged therefrom when the tractor is turned at the ends of the rows.

The objects above set forth, together with more specific objects which will be apparent, are accomplished by the particular construction and novel combinations of parts, as illustrated in the drawing and described in the detailed description to follow.

The invention comprises essentially a tractor propelled planter frame on which a plurality of planter units are mounted, a checking mechanism operated by a check wire, and means on the tractor for receiving the check wire at one side of the planter and laying it down at the other side thereof. Similar means have been previously used on horse drawn planters but have not obtained any commercial importance. In the more modern tractor planter constructions where a plurality of rows, ordinarily four, are planted simultaneously, the customary check wire method, in which the check wire is set over back of the planter, introduces inaccuracies in the check due to the comparatively great lateral space covered by each trip of the planter. It is to overcome these difficulties that the present construction has been devised. Particularly when using tractor mounted planters, it has been found desirable to utilize a construction such as contemplated by this invention. It has been found necessary to provide for adjustment of the wire carrying means when a transverse carrying means is employed. This object of the invention has been accomplished by the provision of laterally shiftable supports for carrying the wire guiding means. By providing supports extending above the wire carrying sheaves, or pulleys, a construction has been obtained whereby, when the tractor has turned sufficiently to release the tension on the check wire, it drops from the sheaves and the tractor turn may be completed. This is an important feature of the invention as it makes possible the turning of a tractor mounted planter without the necessity of the operator removing the wire from the guides. It is understood that the wire is removed from the check head in a customary manner by tripping a release mechanism.

In the drawing:

Figure 1 is a plan view showing somewhat diagrammatically, a tractor mounted planter embodying the features of the invention;

Figure 2 is a rear view of the construction shown in Figure 1; only the rear elements of the tractor and the check wire carrying means being shown; and Figure 3 is a section on line 3—3 of Figure 2.

The tractor, as shown in the drawing, is of a well known tricycle type, in which a narrow body portion 10 is connected to an arched rear axle housing 11. The rear axle housing is provided with downwardly depending housings 12, which form the arched axle construction. Traction wheels 13 are mounted on axles extending from the housings 12, not shown, and are driven by gearing contained in the housings 12. The front of the tractor is supported on narrowly spaced steerable wheels 14. Brackets 15 and 16 extend laterally from the tractor body and are rigidly secured thereto for pivotally supporting on a longitudinal axis a draft member 17. Said member passes through the brackets 15 and 16 and extends laterally away from the tractor body, where it is attached to a short tongue 18 of a grain planter of a conventional type. Said planter has a frame construction 19 which is supported by a pair of wheels 20. Forwardly on the frame planting units 21 are mounted. Said units are provided with any conventional seed dispensing mechanism, not shown, as they do not form a part of this invention. At the outer side of each planter unit a check head 22 is diagrammatically illustrated. Said check heads are provided with check forks 23, adapted to operate the planter mechanisms in the usual manner. The seeding mechanisms at each side of the tractor are connected together so as to be operated in unison. The U. S. Patent #1,775,639 shows a tractor attached planter construction as illustrated. The planters are so spaced with respect to the tractor that the four planter units are equally spaced apart. The U. S. Patent #1,811,041 shows a similar four row planter in which a rockshaft connecting means is embodied for operating the seeding mechanism of the two planters in unison. This type of construction is used on tractor attached planters as illustrated.

At the rear of the tractor a U-shaped draw bar 24 is pivotally connected to the housings 12 on trunnions 12'. Bracing rods 24', connected to the draw bar, are adjustably connected to the upper portions of the housings 12 to provide means for altering the vertical position of the draw bar and the elements carried thereby. Said draw bar 24 extends rearwardly with its transverse portion beyond the drive wheels 13. A transverse bar 25 is rigidly secured to the draw bar 24 and extends laterally a considerable distance from each side of the tractor. At the ends of the bar 25 bearing brackets 26 are adjustably connected, a plurality of openings 27' providing for the lateral shifting of the brackets with respect to the bar 25. Circumferentially grooved sheaves 27 are rotatably mounted on the brackets 26 on vertical axes. The sheaves are deeply grooved to form carriers for holding the check wire 28, as will be hereinafter described. The outer edges of the sheaves are substantially tangent to a longitudinal line through the check forks, whereby there will be little tendency for the wire to be pulled from the check head.

In the operation of a planter as described, the check wire is threaded through a check head at one side of the planter, rearwardly around the sheave at the same side of the tractor, forwardly around the sheave at the other side of the tractor, and is secured to the usual stake 28'. The tractor is then driven forwardly in a straight line. As the buttons on the check wire engage the check forks all of the planter units are simultaneously operated, all of the hills planted thereby being in transverse alignment. The wire being received at one side of the tractor is laid down rearwardly at a laterally spaced position or at the other side of the tractor, to be picked up at the return trip of the tractor. In order that the buttons on the check wire will be in transverse alignment with the hills planted, it is necessary that the wire wound around the sheaves and that amount of the wire extending across the rear of the tractor, be of a length equivalent to a whole number of button lengths. It has been found in actual practice that where four rows are being planted the amount of wire used up in a simple transverse arrangement, as shown in the drawing, is substantially equal to four lengths of wire. The tractor and the planter attachment may, therefore, be built with the sheaves so positioned that proper checking is provided. However, the distance between buttons on the check wire varies somewhat, particularly after the wire has been used and is somewhat stretched. When four rows are being planted, the stretch per length is multiplied by four in an arrangement as disclosed. It is, therefore, very necessary, to prevent this accumulated error from reaching undue proportion relative to the distance between rows and hills, to provide means for adjusting the amount of wire between one longitudinal portion, as extending forwardly from the tractor, and the other longitudinal portion, extending rearwardly therefrom. This adjustment has been provided for in a certain manner by the lateral adjustment of the brackets 26 on the bar 25. It is only necessary to check the buttons on the wire already laid down, with the hills planted, and to adjust the brackets 26 until the buttons are in transverse alignment with the hills. This check may be made periodically and particularly when the wire has been put under undue strain or when different wire is being used.

It is understood that the invention is applicable to all types of tractor mounted and operated planters, as illustrated in the drawing. Applicants contemplate the use of their improved checking attachments wherever such attachments may be found desirable, and limit their invention only by the scope of the appended claims.

What is claimed is:

1. A tractor check row planter comprising the combination of a tractor having front and rear wheels, a ground engaging planter unit pivotally connected to the tractor and located forward of the rear wheels, and laterally spaced check wire carriers mounted on said tractor, said carriers being positioned to receive a forwardly extending check wire engaged by the planter and to deliver it in a laterally spaced position rearwardly, and being spaced such a distance that the first check button on the forwardly extending portion of the wire is spaced longitudinally from the first button on the rearwardly extending portion a distance equal to the distance between two buttons or multiples thereof.

2. A check row planter comprising a tractor, a plurality of transversely aligned wheeled planter units pivotally connected thereto and including seed dispensing mechanisms associated therewith, check forks mounted at the outer side of each of the outer planter units, supporting means extending transversely across the tractor rearwardly of the planter units, wire supporting guides mounted on said supporting means substantially in alignment with the check forks and adapted to carry a check wire under tension extending through the check fork at one side of the tractor and to release said wire at the opposite side of said tractor.

3. A device as set forth in claim 2 in which the guides are peripherally grooved sheaves sustained below the supporting means, whereby the check wire may drop off when the tractor is turned in one direction at a sharp angle and the wire tension thereby released.

4. The combination with a tractor planter comprising a tractor and a check-row planter located forward on the tractor and connected to the forward end of the tractor for floating movement, of check-wire guides on the tractor at opposite sides thereof and rearward of the planter for deflecting a check-wire extending longitudinally of the tractor at one side laterally across the path thereof and delivering same on a parallel line at the opposite side of the tractor.

5. The combination with a tractor planter comprising a row-crop tractor having front and rear wheels, a two-row check-row planter located at each side of the tractor forwardly of the rear tractor wheels including check forks at the outer sides, and freely movable draft connections between the tractor and planters, of a rearwardly extending support on the tractor, a transversely extending member attached to said support back of said wheels and extending laterally to points substantially in alignment with said check forks, and a check-wire carrying device at each end of said member, said devices being adapted to receive and support a check-wire while same is under tension and has passed through the check fork on the planter at one side of the tractor, whereby said wire is guided across the path of both planters and delivered at the opposite side of the tractor.

6. The combination with a tractor planter comprising a row-crop tractor having wide tread rear wheels spaced to span two plan rows and dirigible front wheels, a two-row check-row planter located at each side of the tractor forwardly of the rear tractor wheels with the seed planting units on opposite sides of the tread lines thereof and having check forks at the outer sides and draft connections between the tractor and planters which permit free movement of the planters, of a rearwardly extending support on the tractor, a transversely extending member attached to said support back of said wheels and extending laterally beyond them to points substantially in alignment with said check forks, and a wire carrying device supported below each end of said member by connections adjustable longitudinally on said ends, said devices being adapted to guide and support a predetermined length of check-wire under tension across the rear of the tractor.

7. The combination with a tractor planter comprising a row-crop tractor having wide tread rear wheels spaced to span two plant rows and dirigible front wheels, a two row check-row planter located at each side of the tractor forwardly of the rear tractor wheels with the seed planting units on opposite sides of the tread lines thereof and having check forks at the outer sides and draft connections between the tractor and planters which permit free movement of the planters, of a rearwardly extending support on the tractor, a transversely extending member attached to said support back of said wheels and extending laterally beyond them to points substantially in alignment with said check forks, and a wire carrying device at each end of said member consisting of a circumferentially grooved sheave journaled on vertical pintles depending from the under side of the transverse member, the groove in said sheaves being adapted to receive and support a check-wire while same is under tension and has passed through the check fork on the planter at one side of the tractor, whereby said wire is guided across the path of the two planters and delivered at the opposite side of the tractor.

8. The combination with a tractor corn planter comprising a row-crop tractor having wide tread rear wheels spaced to straddle two rows and dirigible front wheels, a two-row check-row planter located at each side of the tractor forwardly of the tractor wheels connected to the tractor by means allowing free movement relative to the tractor and having check forks mounted at the outer sides thereof, of a transverse supporting member mounted on the rear of the tractor parallel to the axis of the tractor wheels, and a check-wire carrying device mounted under each end of said member substantially in alignment with the check forks to guide and support a transversely extending length of the check-wire while same is under tension.

9. The combination with a tractor corn planter comprising a row-crop tractor having wide tread rear wheels spaced to straddle two rows and dirigible front wheels, and having an overall width less than the width of four rows, a two-row check-row planter located at each side of the tractor forwardly of the tractor wheels with its seed planting units on opposite sides of the tread line of said wheels and check forks mounted at the outer sides thereof, of a transverse supporting member mounted on the rear of the tractor parallel to the axis of said wheels and spanning the four row space occupied by the planters, and a check-wire carrying device mounted under each end of said member substantially in alignment with the check forks, said devices being grooved to retain a transverse length of the check-wire while same is under tension.

ARNOLD E. W. JOHNSON.
BERT R. BENJAMIN.